United States Patent
Rubin

(10) Patent No.: US 11,620,355 B1
(45) Date of Patent: Apr. 4, 2023

(54) DYNAMIC CONTENT OPTIMIZATION SYSTEM AND ASSOCIATED METHODS

(71) Applicant: Matthew B. Rubin, Mount Pleasant, SC (US)

(72) Inventor: Matthew B. Rubin, Mount Pleasant, SC (US)

( * ) Notice: Subject to any disclaimer, the term of this patent is extended or adjusted under 35 U.S.C. 154(b) by 0 days.

(21) Appl. No.: 17/741,602

(22) Filed: May 11, 2022

Related U.S. Application Data

(63) Continuation-in-part of application No. 17/570,486, filed on Jan. 7, 2022, now abandoned.

(51) Int. Cl.
| | | |
|---|---|---|
| *G06F 16/957* | (2019.01) | |
| *G06F 16/9035* | (2019.01) | |
| *G06F 16/9535* | (2019.01) | |
| *G06F 16/954* | (2019.01) | |

(52) U.S. Cl.
CPC ........ *G06F 16/957* (2019.01); *G06F 16/9035* (2019.01); *G06F 16/954* (2019.01); *G06F 16/9535* (2019.01)

(58) Field of Classification Search
CPC .. G06F 40/143; G06F 16/957; G06F 16/9035; G06F 16/9535; G06F 16/954
See application file for complete search history.

(56) References Cited

U.S. PATENT DOCUMENTS

| | | | | |
|---|---|---|---|---|
| 10,459,997 | B1 * | 10/2019 | Agarwal | G06Q 50/01 |
| 2004/0139106 | A1 * | 7/2004 | Bachman | G06F 16/951 |
| 2007/0198345 | A1 * | 8/2007 | Park | G06Q 30/0277 |
| | | | | 705/14.73 |
| 2008/0046471 | A1 * | 2/2008 | Moore | H04L 67/56 |
| 2008/0147729 | A1 * | 6/2008 | Trevor | G06F 16/958 |
| 2009/0300098 | A1 * | 12/2009 | Millmore | G06Q 10/06 |
| | | | | 709/206 |
| 2010/0262599 | A1 * | 10/2010 | Nitz | G06F 16/248 |
| | | | | 707/723 |
| 2013/0291129 | A1 * | 10/2013 | Rose | G06F 16/958 |
| | | | | 726/30 |
| 2015/0112963 | A1 * | 4/2015 | Mojtahedi | G06F 16/9537 |
| | | | | 707/711 |
| 2015/0186532 | A1 * | 7/2015 | Agarwal | G06F 16/951 |
| | | | | 707/736 |

(Continued)

*Primary Examiner* — Thu V Huynh
(74) *Attorney, Agent, or Firm* — Bullock Law; Stephen Bullock

(57) ABSTRACT

Embodiments of the present invention are related to a dynamic content optimization system including a collection engine, a news server, an optimization engine including a filter engine and a markup engine, an intake module, a client setup engine, a client website with an optimized content display module, and an administrative override. The system includes a learning track and an autonomous track and is configured to create the client website using data gathered from the collection engine. The collection engine is structured to gather outside content for storage within the news server and forward it to the optimization engine. The optimization engine is operable to retrieve content from the news server, preprocess the content for comparison against previously rejected data, compare the content for rejection, markup non-rejected content and forward the marked up non-rejected content to the content display module for display on the client website.

17 Claims, 12 Drawing Sheets

(56) References Cited

U.S. PATENT DOCUMENTS

| | | | | |
|---|---|---|---|---|
| 2016/0357753 A1* | 12/2016 | Beaver | ............ | G06F 16/24578 |
| 2017/0017639 A1* | 1/2017 | Bute | .................... | H04W 8/205 |
| 2019/0266572 A1* | 8/2019 | Foss | ................... | G06F 16/9535 |
| 2020/0302540 A1* | 9/2020 | Xiu | ......................... | G06N 5/04 |
| 2021/0110475 A1* | 4/2021 | Singh | .................... | G06K 9/622 |

* cited by examiner

109

301 Receive Input from Dashboard
* Keyword Modifiers
* Model Articles

302 Scan User Supplied Articles for Recurring Keywords

Compare w/ Keyword Modifiers to get Comparison Keywords

303 Scan & Compare Comparison Keywords to 107 Article Text

Obtain a Pre-Established threshold of 107 Articles from Comparison

304 Pre-Established # of Articles Present?

No → Broaden Search Criteria (loop back to 302)

Yes → 305 Forward Articles to Markup Engine

| Sentence → <br> Unique Word ↓ | the | cat | sat | on | the | mat |
|---|---|---|---|---|---|---|
| sat | 0 | 0 | 1 | 0 | 0 | 0 |
| cat | 0 | 1 | 0 | 0 | 0 | 0 |
| mat | 0 | 0 | 0 | 0 | 0 | 1 |
| ... <br> N unique words | ... | ... | ... | ... | ... | ... |

704b

| Word | IDF | Value |
|---|---|---|
| the | log (2/2) | 0 |
| car | log (2/1) | .3 |
| is | log (2/2) | 0 |
| driven | log (2/2) | 0 |
| on | log (2/2) | 0 |
| the | log (2/2) | 0 |
| road | log (2/1) | .3 |
| highway | log (2/1) | .3 |

| "this" "this" "this" "is" "is" "one" "one" "one" "one" |
|---|
| 801 |
| "this" x 3; "is" x 2; "one" x 4; |
| 802 |
| [0, 2, 0, 0, 4, 0, 0, 3, 0] |
| 803 |

FIG. 8C

| VOCABULARY | VALID NEWS (0) | INVALID NEWS/ ADS (1) |
|---|---|---|
| Sell | 1 | 4 |
| Your | 0 | 0 |
| Toyota | 2 | 5 |
| Car | 3 | 3 |
| To | 0 | 0 |
| Us | 0 | 1 |

Exclude Word | Prediction | Data Set | Train | Logout

Exlude Words

+ | 🗑 | Resync

| | |
|---|---|
| violent | 🗑 |
| police | 🗑 |
| dealership | 🗑 |
| died | 🗑 |
| listing | 🗑 |
| chevrolet | 🗑 |
| honda | 🗑 |
| toyota | 🗑 |
| ford | 🗑 |
| hyundai | 🗑 |
| apr | 🗑 |
| mis | 🗑 |
| survive | 🗑 |
| criminal | 🗑 |
| listing | 🗑 |

FIG. 11A

Exclude Word | Prediction | Data Set | Train | Logout

Data Maintain

Prepare Dataset
Show [ 10 ⌄ ] entries                                    Search: [        ]

| Id | News | Unique Words | Predicted Ads | Manual Ads |
|---|---|---|---|---|
| 608 | ANYTOWN, USA - This is an article to serve as a demonstration of the system and to complete this section with words that may be unique in some instances and may be generic in other instances. "Here is an example of a quote within an article." This word is bad. This word is unique. This word is irrelevant. These words are treated differently depending on how the algorithm views them within the system. | practice pm visitor great grow emotional nashnewland serve charleston bring hosptal nexton march innovative carolina system include flagship fullservice ribbon news see clinic set walkable provider gibadio counselor newland myrtle development planning highlevel business selling access mt asset exec technology announce value able regional list opening scbiztv savannah south join range pleased wide carolinas cutting staff pleasant hub outdoor group customer operation conveniently realize rate good recognize coastal dr cofounder number new office columbia sekisui transformational facility say develop offer honor brand apply embrace organization design physical less practitioner field nash jessica newlandcocom financial andrology sustainable charles growth manage excited foster resident robert wellbeing beautiful celebration patient assist commitment share february lab biz | 1 | ☆ |

FIG. 11B

Exclude Word | Prediction | Data Set | Train | Logout

Train Data

Add/Insert new data in dataset:

[ Predict ]

Train and Recreate Model: [ Train Data ]

Predict Whole Database: [ Predict All ]

FIG. 11C

Exclude Word | Prediction | Data Set | Train | Logout

Prediction where McAlister Square currently stands.

1914: Charles and J.E. Beattie close their dry goods shop, noted as having one of the biggest and best dry stocks in upper South Carolina. Howebver, Charles continues to exist as one of the most prominent businessmen in the city.

1932: Charles McAlister dies from illness.

1965: Caine Company announces plans for the two-phase constructino of teh 600,000-sqft McAlister Square at U.S. 291 (S. Pleasantburg Drive) + Laurens Road. A family account notes that the development would be named McaLister Result: Predicted [ Predict ]
Advertisement Possibility: 85.35777305951342%
Excluded: Yes! Excluded Sanitized Content: enclose your purchase haywood move charle remove limited plan roof damage college ivey small left stolz corridor history major collapse open owner evidence south shop mcalistr consider laurens have join northern way system corporation shopping offer moment bad note die businessman business access cause sqft charles apparel meyersarnold near dec drive learn krupp sell mcalister like 1870s call lock simpson accord whichever pleasantburg renovation illness miss center good announce belk creamcolore.

FIG. 11D

DYNAMIC CONTENT OPTIMIZATION SYSTEM AND ASSOCIATED METHODS

FIELD OF THE INVENTION

The present invention relates to systems and methods for dynamically selecting and optimizing end user content. In particular, the present invention relates to a dynamic content optimization system and associated methods for display on a user's website.

BACKGROUND

Maintaining current, relevant content on a webpage engages visitors and facilitates optimum placement of that webpage in search result listings. However, manually maintaining such content with proper html markup and optimization is not a practical reality for most businesses. Furthermore, ensuring the content meets company quality control and relevance standards adds an additional layer of impracticality for a busy modern business.

There exists a need in the art for a system that dynamically creates a website then maintains the website with current news articles that are relevant in both their scope and geographic relation to the business owner. Furthermore, there exists a need in the art for this process to be automated with proper protocol markup and content monitoring. Therefore, there exists a need in the art for a Dynamic Content Optimization System and Associated Methods.

SUMMARY OF THE INVENTION

Embodiments of the present invention are related to a dynamic content optimization system including a collection engine, a news server, an optimization engine with a filter engine and a markup engine, an intake module, a client setup engine, a client website including an optimized content display module, and an administrative override. The system includes a learning track and an autonomous track and is configured to create the client website using data gathered from the collection engine. The collection engine is structured to gather outside content for storage within the news server and forward it to the optimization engine. The optimization engine is configured to retrieve content from the news server, preprocess the content for comparison against previously rejected data, compare the content for rejection, markup non-rejected content and forward the marked up non-rejected content to the content display module for display on the client website.

In this embodiment they system may be structured to receive user supplied input comprising keyword modifiers and model articles, scan user supplied articles for recurring keywords, compare user supplied input and article keywords with keyword modifiers to obtain comparison keywords, scan and compare comparison keywords to article text, obtain a pre-established threshold number of articles for comparison, and forward articles to the markup engine if the pre-established threshold number of articles has been realized.

Furthermore, the filter engine may be structured to autonomously broaden the search criteria and rescan user supplied articles for recurring keywords if the pre-established number of articles has not been realized from a first iteration. Additionally, the client setup engine may be structured to obtain client identification information, obtain keyword modifiers for storage within the system, obtain model articles for storage within the system, and establish a client dashboard.

The markup engine may be structured to receive selected articles, scan received articles for obtained keywords and apply tag meta data to them, scan received articles for external links and apply "no follow" tags, place an article summary on the client dashboard and post a marked-up article on the client website.

Furthermore, the system may be operable to compare potential new articles against an archive of rejected articles and structured to store rejected articles for comparison against potential new articles. The system may be structured to determine, by a pre-established threshold, that potential new articles are dissimilar to rejected articles, accept and post the dissimilar new articles on the client website.

Additionally, the client website may include a title section with specific locale of the client as determined from the client intake engine and setup engine; and wherein the system is configured to post new articles to the client website related to the title section.

In other embodiments, the dynamic content optimization system may include a collection engine, an optimization engine with a filter engine including, a text preprocessor and a transformation engine, a markup engine, an intake module, a client setup engine, a client website with an optimized content display module, and an administrative override. The system may include a learning track and an autonomous track and may be structured to create the client website using data gathered from the collection engine. It may be structured to gather outside content for storage within the news server and the text preprocessor may be operable to remove metadata, remove pre-established valueless words, remove punctuation, remove urls, reduce text to root words, and format article text for later processing. The transformation engine may be structured to transform text from the text preprocessor into a system recognizable format and the optimization engine may be structured to retrieve content from the news server, preprocess the content for comparison against previously rejected data, compare the content for rejection, markup non-rejected content and forward the marked up non-rejected content to the content display module for display on the client website.

In this embodiment, the system may be structured to generate the recognizable format by using at least one of one-hot encoding, count vectors, and word embeddings. The transformation engine may be structured to tokenize article text that has been preprocessed by way of vocabulary lookup and feature hashing before converting the tokenized text to a system recognizable format. The learning track may include a preprocess segment, a feature extraction segment, a training segment and a testing segment operable to prequalify articles before displaying them on a client website.

This embodiment may further include the filter engine with a testing module. that may be structured configured to split text data into an x-validation variable signifying acceptable content and a y-validation variable signifying unacceptable content. Furthermore, the x-validation variable text data may be transformed into numerical input for testing. The testing module may be operable to find a vector for each text in the x-validation variable, map the vector and compare it against a threshold to determine a prediction accuracy. Furthermore, the system may be structured to store x-validation variable data for comparison against potential new articles if the x-validation variable data is considered unacceptable. It may further be structured to post potential new articles to the client website if they do not align with the x-validation variable data to a degree within a predetermined threshold.

Additionally, the administrative override may include a manual entry text field configured to allow an administrator to enter article information for system training. The administrative override may include a prediction button configured to manually prompt the system to predict whether the entered text is acceptable. Furthermore, the manual override may be structured to store unacceptable text for comparison against potential new articles.

Another embodiment of the invention may include a collection engine, an optimization engine with a filter engine including a text preprocessor and a transformation engine, a markup engine, an intake module, a client setup engine, a client website comprising an optimized content display module, and an administrative override. It may include a learning track and an autonomous track, and may be structured to create the client website using data gathered from the collection engine. The collection engine may be structured to gather outside content for storage within the news server and the text preprocessor may be structured to remove metadata, remove pre-established valueless words, remove punctuation, remove urls, reduce text to root words, and format article text for later processing. The transformation engine may be structured to transform text from the text preprocessor into a system recognizable format utilizing at least one of word embeddings, count vectors, and one-hot encoding. The optimization engine may be operable to retrieve content from the news server, preprocess the content for comparison against previously rejected data, compare the content for rejection, markup non-rejected content and forward the marked up non-rejected content to the content display module for display on the client website.

In this embodiment, the system may be operable to tag unapproved articles based on article content and store them for comparison against potential new articles. The system may be structured to use article tags as keyword modifiers for comparison against potential new articles to determine the acceptability of the potential new articles for posting on the client website. Furthermore, the client website may include a title section with a geographic location of the client as determined from the client intake engine and setup engine. Additionally, the system may be operable to post articles on the client website related to the geographic location listed in the title section.

BRIEF DESCRIPTION OF THE DRAWINGS

FIG. 3 is a block diagram of a filter engine according to an embodiment of the invention illustrated in FIG. 1.

FIG. 8B is a representation of algorithmic processing of the dynamic content optimization system backend according to an embodiment of the invention.

FIG. 8C is a representation of algorithmic processing of the dynamic content optimization system backend according to an embodiment of the invention.

FIG. 11A is a representation of manual administrative functionality of the dynamic content optimization system backend according to an embodiment of the invention.

FIG. 11B is a representation of manual administrative functionality of the dynamic content optimization system backend according to an embodiment of the invention.

FIG. 11C is a representation of manual administrative functionality of the dynamic content optimization system backend according to an embodiment of the invention.

FIG. 11D is a representation of system processing of manual administrative functionality of the dynamic content optimization system backend according to an embodiment of the invention.

DETAILED DESCRIPTION OF THE INVENTION

The present invention will now be described in detail with reference to the accompanying drawings. The embodiment descriptions are illustrative and not intended to be limiting in any way. Other embodiments of the invention will readily suggest themselves to persons with ordinary skill in the art after having the benefit of this disclosure. Accordingly, the following embodiments are set forth without any loss of generality and without imposing limitation upon the claimed invention.

Directional terms such as "above" "below" "upper" "lower" and other like terms are used for the convenience of the reader in reference to the drawings. Additionally, the description may contain terminology to convey position, orientation, and direction without departing from the principles of the present invention. Such positional language should be taken in context of the represented drawings.

Quantitative terms such as "generally" "substantially" "mostly" and other like terms are used to mean that the referred object, characteristic, or quality constitutes a majority of the referenced subject. Likewise, use of the terms such as first and second do not necessarily designate a limitation of quantity. Such terms may be used as a method of describing the presence of at least one of the referenced elements or may provide a means of differentiating orientation. The meaning of any term within this description is dependent upon the context within which it is used, and the meaning may be expressly modified.

As will be further described herein, the dynamic content optimization system and associated methods, hereinafter the system 100, may be an automated application for developing a website landing page. By way of non-limiting example, this may include having the system 100 maintain a local area webpage, a product webpage, a real estate listing webpage, or the like. The system 100 is operable to autonomously maintain the webpage with current and relevant content posted in real time.

Figure 1:
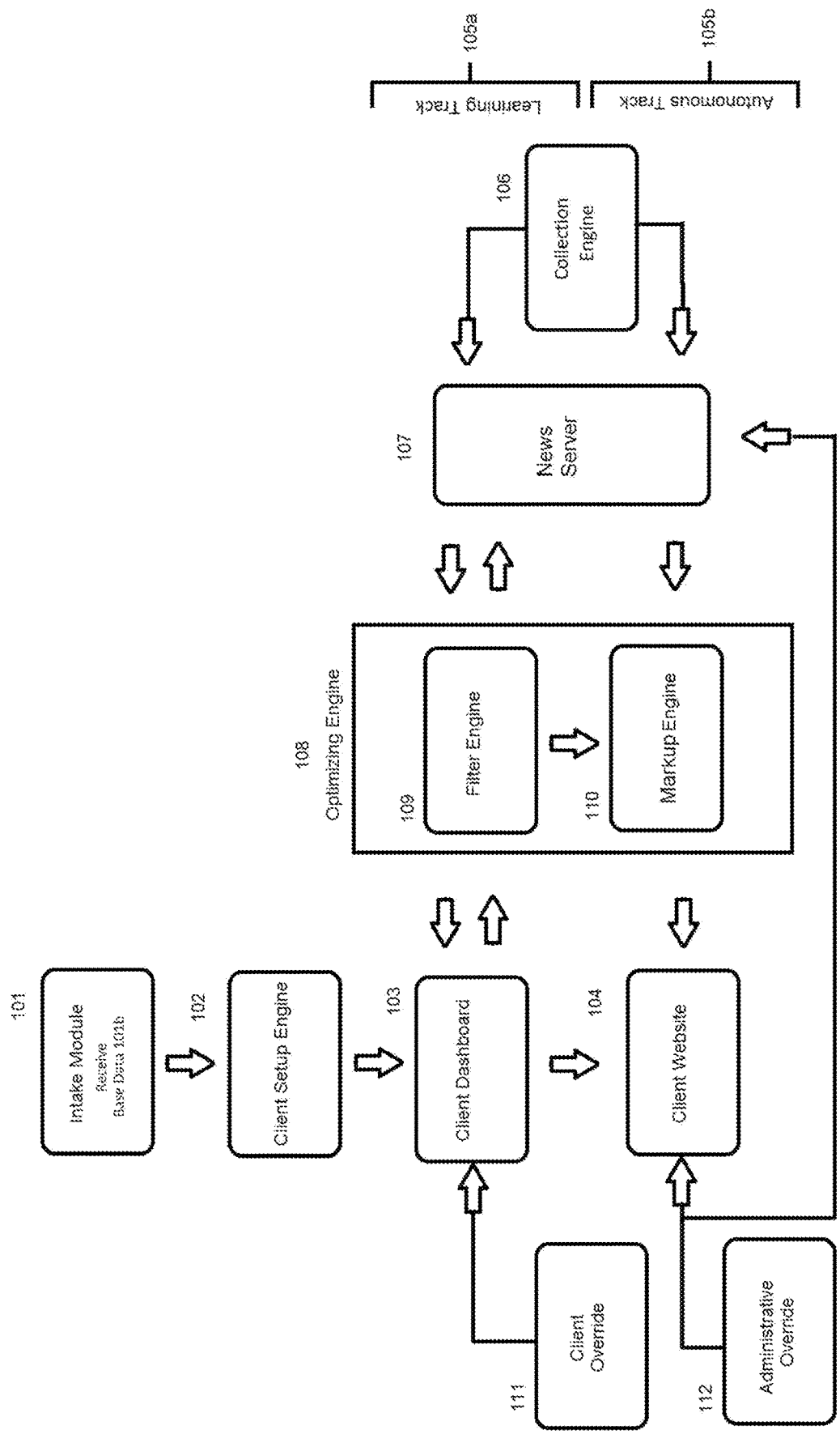
FIG. 1 is a diagrammatic overview of the dynamic content optimization system according to an embodiment of the invention.

FIG. 1 illustrates an overview of the system 100. As shown, an embodiment of the system 100 may include a client intake module 101 feeding into a client setup engine 102. The client setup engine 102 may then initialize the client dashboard 103 and ultimately establish a client website 104.

The client dashboard 103 may be a client command center for the client to maintain control of posted content on the client website 104 and may serve as a base for autonomous learning of the system 100. By way of non-limiting example, the client dashboard 103 may include profile and intake information gathered from the intake module 101, summaries of content currently being posted, summaries of content previously posted, as well as design control of the client website 104 including formatting control of content and images. The client dashboard 103 may also include a manual client override 111 for automatically posted content so that the client may maintain control of all of the content that is ultimately displayed on the client website 104. In some embodiments, the client via the client override 111 may reject articles that have been incorrectly approved by the system 100. Likewise, the client may approve articles that have been incorrectly rejected by the system 100. The system 100 may learn from manual overrides provided by the client and may post to the client website 104 more client tailored content as a result.

As further shown by FIG. 1, the system 100 may include two tracks to facilitate what content is posted on the client website 104. There may be a learning track 105a and an autonomous track 105b. Both tracks 105a, 105b may begin with a collection engine 106 that may scour and select outside news articles to be processed and used by the system 100. The collection engine 106 may apply Boolean operator selection criteria to information gained from the client intake module 101 to narrow the outside articles that are initially selected and chosen to be integrated into the system 100. By way of non-limiting example, the Boolean operator selection criteria may include a selector such as (specific genre AND specific geographic location NOT specific subject). This may bring resulting articles relevant to a particular business within a region that does not attach to a particular subject matter. Other criteria may be applied to the selection criteria such as article word count.

Once articles have been chosen by the collection engine 106, they may be stored on the news server 107. The news server 107 may be a library of articles that have passed through the initial stage of selection that are maintained by the system 100 for quick retrieval. In some embodiments, the news server 107 may apply storage criteria to articles including a weighting algorithm applied against a client database to see that the stored articles are still relevant to the current clients using the system 100. Furthermore, in some embodiments, each article may be given a numeric assignment based on relevance and use within the system. By way of non-limiting example, an article that is more than 3 months old that does not describe a business genre matching a client within the current client list may be given a "2" on the system 100. However, an article that is one day old matching several client business genres may be given a "9" on the system. The system 100 may conduct periodic automated internal audits to purge articles from the news server 107 that fall below a predetermined numeric threshold. Other embodiments may include archiving rejected articles for storage within the news server 107 for retrieval and comparison. In some embodiments this may include tagging articles with keyword identifier tags to be compared against keyword identifier tags of potential new articles. Potential new articles for posting may be compared against rejected articles to determine their kinship with those rejected articles. Articles that bear a strong kinship with rejected articles may be filtered and archived for later comparison, but not posted. Articles that are dissimilar to the rejected articles may be considered relevant articles and passed on to be posted by the system 100. Kinship may be recognized by the system 100 from a pre-established threshold. By way of non-limiting example, if the potential new article bears a 50% kinship with a rejected article as shown by a comparison of keywords and tags, then then new article may be rejected and stored in the system 100 as such.

Continuing with the learning track 105a, the articles stored within the news server 107 may be selected by the optimizing engine 108 for processing and ultimately for display on the client website 104. The optimizing engine 108 may include a filter engine 109 and a markup engine 110. While the client is still new and the system 100 is learning client's business and ideal optimization patterns, the optimizing engine 108 may send potential articles that have been processed to the client dashboard 103 for client approval before posting. In other embodiments, the system 100 may automatically post processed articles, but send a notice to the client dashboard 103 for continued approval.

Once the system 100 has completed several iterations through the learning track 105a, it may transition the client account to the autonomous track 105b. In some embodiments, the transition may require a threshold number of articles to be approved by the client and selected for display. In other embodiments, the transition may require a predetermined period of time, for example two months before transitioning to the autonomous track 105b. In any embodiment, the objective of the system 100 is to reach a point where articles are automatically selected and posted to the client website 104 without human intervention. At that point, the transition has been based on reliable and reinforced past performance.

In any embodiment, the system 100 may include an administrative override 112 to ensure that posted content on the client website 104 is appropriate and relevant. Furthermore, the administrative override 112 may assist with the learning track 105b to facilitate properly applied selection criteria and posted articles. The combination of client override 111 and administrative override 112 may ensure that the posted content to the client website 104 is accurate, to the client's satisfaction, and suitable for its purpose.

Figure 2:
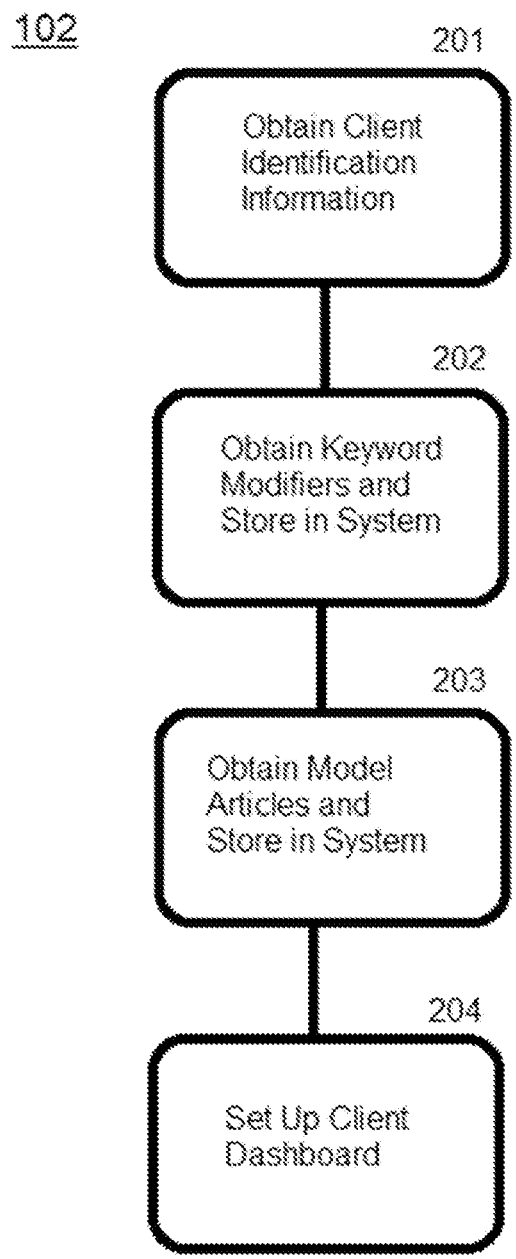
FIG. 2 is a block diagram of an initial setup engine according to an embodiment of the invention illustrated in FIG. 1.

FIG. 2 takes a closer look at how the client setup engine 102 processes information received from the client intake module 101. The intake module 101 may request information from a client to begin initializing the system 100. By way of non-limiting example, client intake information may include name and contact information, tax identification number, social media information and links, reviews, logos, credit card information, cities served, product and service information, and other personal and business identification type data. In addition to this information, the client intake module 101 may request a certain type of information defined as base data information 101a. By way of non-limiting example, base data information 101a may include articles that a client finds relevant to their industry, defined as base articles, as well as keywords that a client finds relevant to their industry, defined as base keywords. The base articles may include those found on social media sites, news articles from local media stations, and the like. The base articles may be hand-selected by the client to assist with initializing the system 100 to the client's industry and individual business. Combined with the base keywords chosen by the client, the system 100 may begin orienting itself to the client's needs, preferences, and business particulars.

As shown in FIG. 2, the client setup engine 102 may obtain from the client intake module 101 client identification information 201, obtain keyword modifiers for storage within the system 202, as well as obtain model articles for storage within the system 203. The data obtained from blocks 201-203 may be considered the base data information 101a used by the system 100 to establish the client dashboard 103, initialize autonomous learning, and create the client website 104.

FIG. 3 demonstrates more details of the filter engine 109 found within the optimizing engine 108. The filter engine 109 may receive input from the client dashboard 301 including the base data 101a with the base keywords and base articles presented by the client. In some embodiments, the filter engine 109 may receive additional keyword modifiers and model articles from the administrative override 111. Once the base data 101a is received by the filter engine 109, block 302 illustrates that the user supplied articles may be scanned for recurring keywords to orient the system 100 with subject matter, geography, genre, and the like related to the client. These scanned keywords may be compared with the keyword modifiers from the base data 101a and potentially by the administrative override 112 to get a list of comparison keywords.

As shown by block 303, the comparison keywords may be matched against keywords scanned and retrieved from articles stored in the news server 107. In some embodiments, the comparison keywords may need to meet a threshold number of scanned keywords from the news server 107 articles. By way of non-limiting example, the news server 107 article may need to contain at least three comparison keywords to be selected as an article for display on the client website 104. In some embodiments, the articles selected from the news server 107 may undergo additional Boolean operator selectors to ensure relevance. By way of non-limiting example, the Boolean operator selection criteria may include a selector such as (client business genre AND client geographic location NOT client competitors). This may bring articles from the news server 107 that are relevant to the client's business, within their specific geographic location, that are not about their competitors. Such selection criteria may ensure that a client is not inadvertently promoting or slandering their competitor's business.

In some embodiments, the filter engine 109 may compare previously accepted or rejected articles stored on the news server 107 that have been labeled accordingly to assist with predictive selection. By way of non-limiting example, rejected articles may be stored and cataloged for future comparison and accepted articles may be assigned language comparison tags such as a keyword tag, a city name tag, as well as other custom tags. Tags may prevent the need to create separate news feeds for each client since the articles on particular news feeds can be grouped and recalled using the tag system.

In some embodiments, the number of articles qualified for display may have to meet a predetermined amount. By way of non-limiting example, in order to be forwarded to the client website 104 for display, the filter engine 109 may require at least four articles from the news server 107 to be a match before forwarding them to the client website 104. As shown by block 304, if a predetermined number of articles are not found, for example no articles contain the required criteria and no articles have been chosen, the filter engine 109 may be sent back to the step shown in block 302 for another iteration with broader search criteria to rescan articles for recurring keywords to return a larger number of articles. As shown by block 305, once a predetermined threshold of articles has been established, they may be forwarded to the markup engine 110 for processing.

Figure 4:
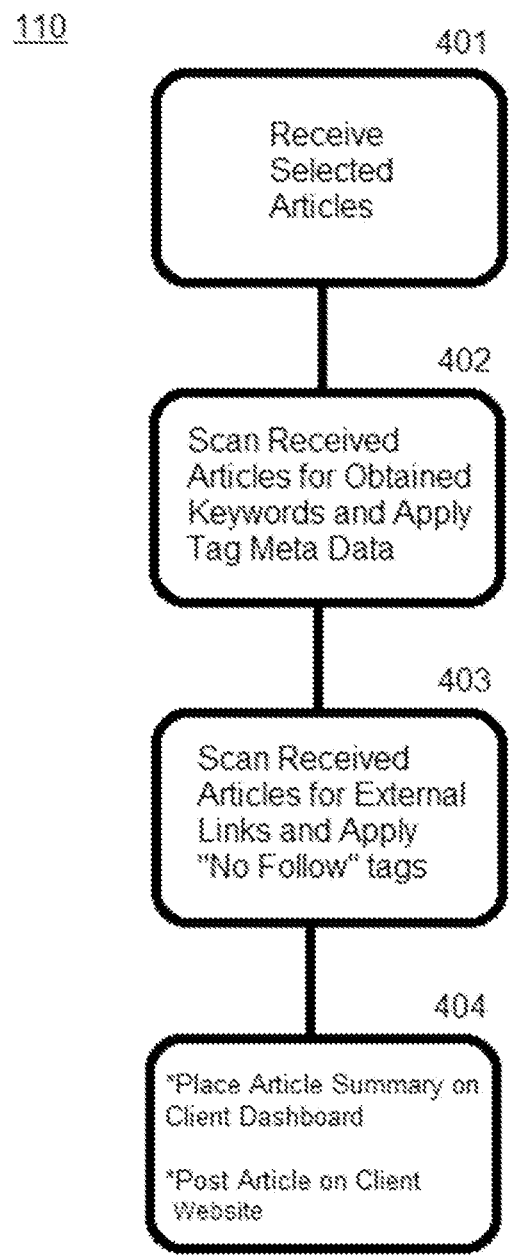
FIG. 4 is a block diagram of a markup engine according to an embodiment of the invention illustrated in FIG. 1.

FIG. 4 takes a closer look at the markup engine 110. As shown by block 401, the markup engine 110 may receive the selected articles from the filter engine 109. Once received, the markup engine 110 may scan the received articles for obtained keywords and apply tag metadata, 402. If the scanned articles contain external links, the markup engine 110 may apply appropriate tag metadata to disable those links such as "no follow" tags, 403. Furthermore, the markup engine 110 may apply subject matter tags to the articles themselves to enable quick retrieval and reference for possible use with other clients. Additionally, the markup engine 110 may automatically attach appropriate schema markup tags to flagged keywords to enhance search optimization without client intervention. Once the markup engine 110 has completed the revisions to the articles, it may place summaries of the articles on the client dashboard 104 and may post them on the client website 104.

By way of non-limiting example, a use case for the system 100 will now be described. One type scenario may involve a large car window tinting franchise. This company may have a location within a city that services all other cities within its respective county. In order to optimize this company's internet presence within that county, it may desire to have a webpage for each of the cities that the business services. Each city webpage of the business may include news articles about current events within that city on each respective city's webpage. Furthermore, the business may desire for the webpage to include news articles about styles of window tinting, damage from sun exposure, lifestyle articles about aftermarket accessories, and the like.

As previously mentioned, maintaining current and relevant content on a webpage facilitates optimum placement of that webpage in search result listings. However, manually maintaining such content with proper html markup and optimization is not a practical reality for most businesses. Furthermore, ensuring the content meets company quality control and relevance standards adds an additional layer of impracticality for a busy modern business. By way of non-limiting example, an article that mentions a window tint business in the context of a rival company business owner's contested divorce may include relevant keywords, but not meet quality control standards for republishing.

Embodiments of the present system 100 may ensure that automated and relevant content that meets quality control standards is autonomously and consistently fed through the system 100 and posted on the client's website 104. By learning from the client override 111, the administrative override 112, and the learning track 105a, the system 100 is able to provide reliable and consistent results. Furthermore, the comparison algorithm between language in rejected and accepted articles combined with the other features ensure a high level of accuracy for meeting client standards and needs.

Continuing by way of non-limiting example, if the system 100 rejected an article for including a competitor's name and divorce it would store and label the rejected article in the news server 107 as being rejected included tags such as "rejected" along with the competitor's name and "divorce". A subsequent article that was being fed into the system 100 through the collection engine 106 and stored in the news server 107 would similarly be rejected. This is because the filter engine 109 may use the comparative tags from the previously rejected article including "rejected", the competitor's name, and "divorce" against the same or similar keywords scanned and found in the new article. The new article would then be rejected as being similar to the previous article, labeled and stored in the news server 107 with the appropriate tags. That newly rejected article, like the previously rejected article, would then be retrievable for potential future use, approval through client override 111, approval by administrative override 112, or purge.

Figure 5:
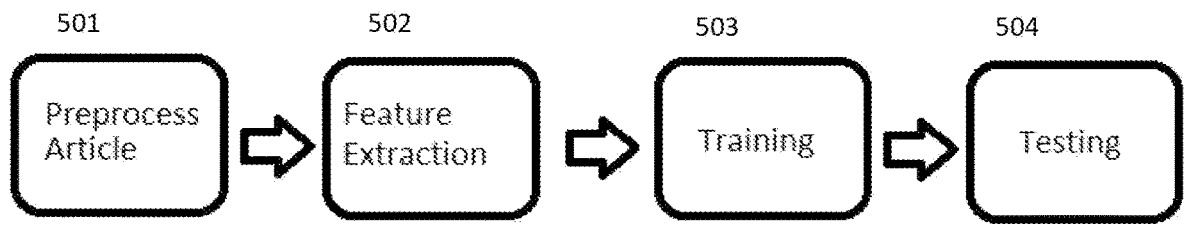
FIG. 5 is a diagrammatic overview of the dynamic content optimization system backend according to an embodiment of the invention.

FIG. 5 illustrates an overview of the backend of the article selection process. In particular, the system 100 and more particularly the learning track 105a may preprocess an article 501 before performing feature extraction 502. Then, the system 100 may conduct training 503 based on the extracted results and may conduct testing 504 to refine the training. New articles may autonomously undergo these procedures before being posted to a client website autonomously.

Figure 6:
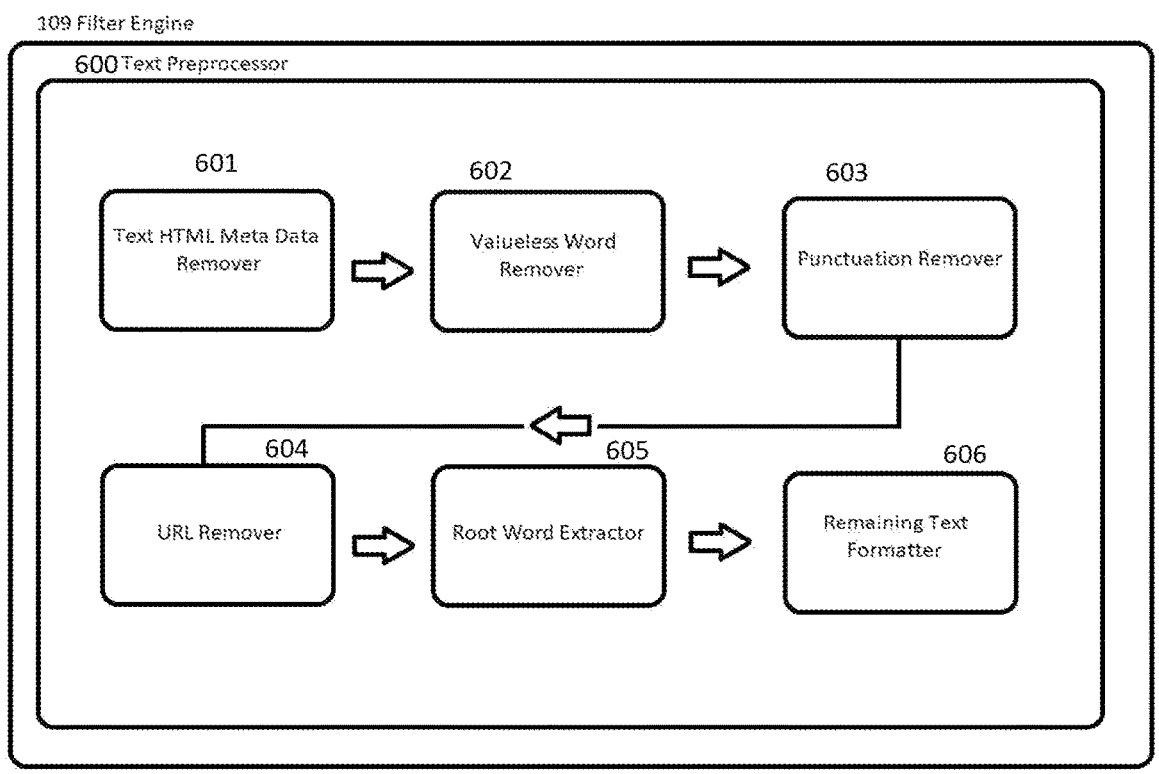
FIG. 6 is a flowchart diagram of a text preprocessor found within a filter engine of the dynamic content optimization system backend according to an embodiment of the invention.

FIG. 6 shows the innerworkings of a text preprocessor 600 that resides within the filter engine 109. In particular, when an article is selected to be considered by the system 100 the article text may undergo a series of procedures to prepare it for consideration. This may be considered the preprocessing stage 501 illustrated in FIG. 5.

Initially, a text HTML metadata remover 601 may remove all metadata elements including html elements from the text before passing it to the valueless word remover 602. The valueless word remover 602 may consider which words don't add any importance to the article. This may also be considered "stop" words, or a list of words that have been predetermined to not add value to any article. These words may be removed to assist with a mathematical consideration of the article's value. For example, the word "a" may be removed since it does not provide any insight to the article and therefore is given very little, if any weight when considering an article's relevance. Next, the punctuation remover 603 may be called upon to remove any punctuation from the text. The URL remover 604 may remove URL elements from the text and the root word extractor 605 may strip base words down to their root word element. Therefore, tenses and alternate meanings may be removed to better assign a mathematical value to each considered word. The remaining text may be formatted 606 and stripped down to its simplest form for mathematical consideration by the system 100.

Figures 7, 8A:
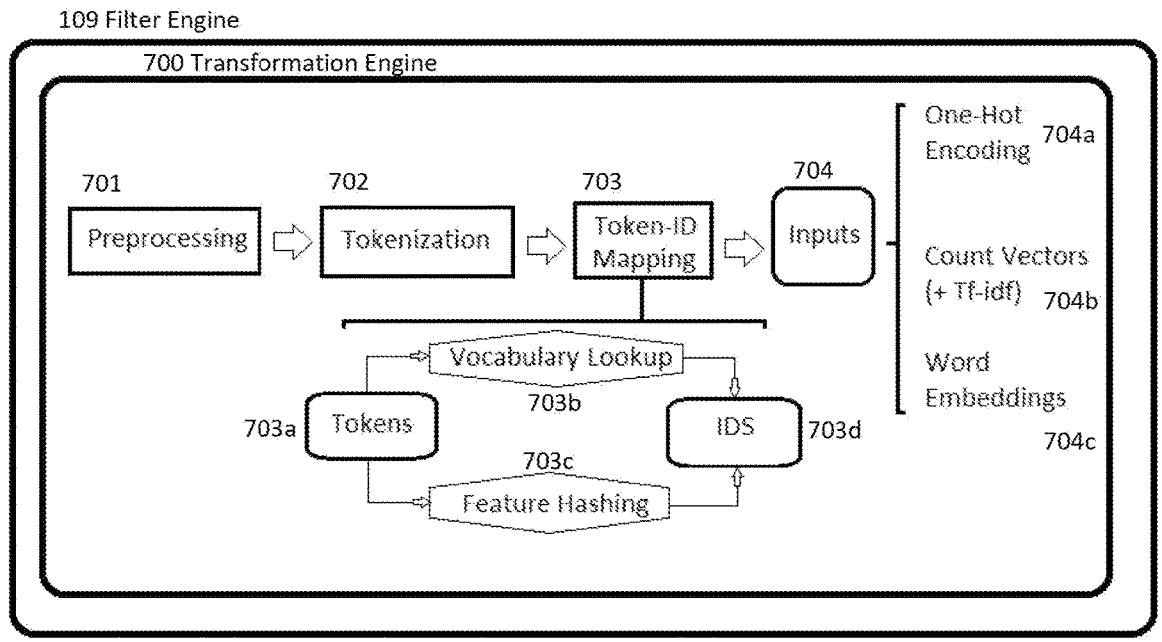
FIG. 7 is a diagrammatic representation of a transformation engine found within a filter engine of the dynamic content optimization system backend according to an embodiment of the invention.
FIG. 8A is a representation of algorithmic processing of the dynamic content optimization system backend according to an embodiment of the invention.

FIG. 7 shows a transformation engine 700 that may be a part of the filter engine 109. The transformation engine 700 may assist with converting the preprocessed text into values that are able to be mathematically evaluated for relevance. In other words, the transformation engine 700 may assist with transforming the text into a system recognizable format. As shown, once the text has been preprocessed 701 it may then be sent for tokenization 702. Tokenization 702 is the splitting of a phrase, sentence, paragraph, or entire text document into smaller units for evaluation. Furthermore, the process of token id mapping 703 may prepare the text as inputs for evaluation. During token id mapping 703, hashing may be used on the texts to mark the text with unique identifiers, or token IDs. Token IDs may be diversified depending on how they are used or needed within the system 100. As a part of that process and as shown, the tokens 703a may be used for vocabulary lookup 703b and feature hashing 703c to obtain their identifiers. These identifiers may then be used as input for evaluation 704. By way of non-limiting example, inputs 704 may include those obtained from one-hot encoding 704a, count vectors (+Tf-idf) 704b and word embeddings 704c.

FIGS. 8A through 8C illustrate the several types of input the system 100 may utilize when evaluating text. FIG. 8A shows how the system may handle text using one-hot-encoding 704a. By way of non-limiting example, a sentence such as "the cat sat on the mat" may be broken down into individual words within the sentence as well as unique words. Each word may be assigned a value according to its relevance within the article as well as its relevance to the needs of the system 100. As shown, the words "the" and "on" are given a value of 0 in a vector block, or not relevant. "Sat", "Cat, and "Mat" are given values of 1, or are considered relevant. Furthermore, in some embodiments, the system 100 may view the sentence as a hexadecimal value of 011001 and compare the hexadecimal value to a threshold value for relevance.

FIG. 8B shows how the system may handle text using TF-idf Vectorization 704a. In this example, the sentence "the car is driven on the road/highway" is multiplied by a logarithmic algorithm to assign a value to each word. In this particular example, the words "the" "is" "driven" and "on" are given values of 0, or no value. The words "car" "road" and "highway" are given values of 0.3. The values can be totaled and compared against a threshold value by the system 100 to determine the relevance and value of the sentence.

FIG. 8C illustrates another means by which the system 100 may handle text in order to evaluate its value based on the number of times a particular word appears in the text. Those numbers are then placed into a matrix to be compared to a threshold established by the system 100. In this particular example, the word "this" is used three times, "is" is used two times and "one" is used four times. The comparative matrix may look like [0, 2, 0, 0, 4, 0, 0, 3, 0].

Figures 9, 10:
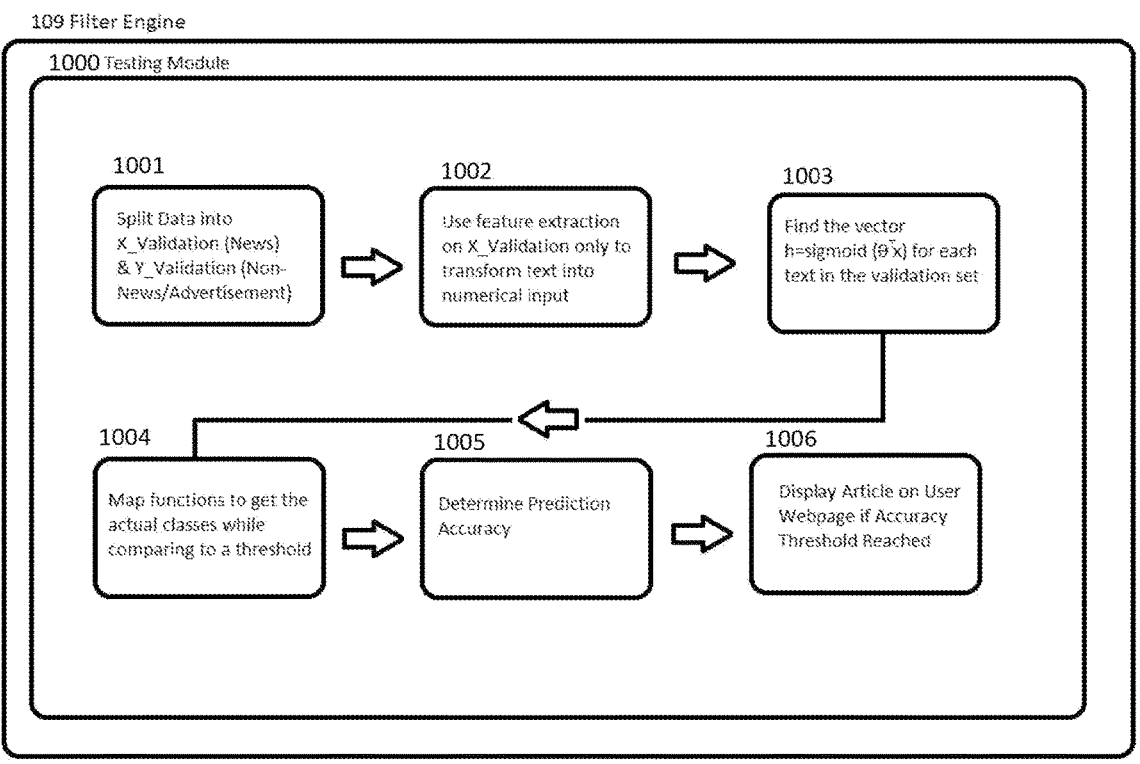
FIG. 9 is a representation of algorithmic processing of the dynamic content optimization system backend according to an embodiment of the invention.
FIG. 10 is a flowchart representation of a testing module found within a filter engine of the dynamic content optimization system backend according to an embodiment of the invention.

FIG. 9 is another representation of how the system 100 may break down article text to determine the frequency of words used and their relevance to the purpose of the system 100. In this example, the chart indicates how the system 100 may determine whether the article is an advertisement or a relevant article. For example, as shown, if the word "Sell" is appearing four times in an article, the selection algorithm may determine that the article is an advertisement. However, if the word "Sell" appears only once, then the algorithm may determine that the article is valid. The same holds true for words like "Toyota®", and "Car".

FIG. 10 explains the selection algorithm and testing module 1000 of the system 100 in more detail. As shown, the filter engine 109 may also include a testing module 1000 that may first split data into an X-Validation variable indicating it is a news article and thus acceptable content and a Y-Validation variable indicating it is a non-news article or advertisement and therefore unacceptable content, 1001. Or, in some embodiments the system 100 may split the data into x_training=(x % news with ad/non ad marks), y_validation=(y %=(100%−x %) news with ad/non ad marks). Block 1002 indicates that one of the feature extraction methods may be used on the X-Validation variable only to transform the text into numerical input. Next, block 1003 indicates that the system may find the vector h=sigmoid(Θтx) for each text in the x-validation variable. The system may then map the resulting vectors or functions to get the actual classes while comparing to a threshold, 1004. This comparison is then used to determine a prediction accuracy, 1005. Lastly, an article that has been determined to be newsworthy is placed on a user's webpage if a predetermined accuracy threshold has been reached, 1006.

FIGS. 11A-11D illustrate how the system 100 may operate using the administrative override 112 outlined in FIG. 1. As such, FIG. 11A shows that the system 100 may maintain a list of exclude words that may be supplemented or removed by an administrator. This list may be automatically generated by the system 100, but may be maintained by an administrator. These words may be used as threshold comparative vocabulary to eliminate words and articles that prima facie don't have value to the system 100.

FIG. 11B shows that during its normal course, the system 100 may intake an article as shown by the "news" column, extract the unique words, and predict whether it is an advertisement or not. The "Manual Ads" column may be used to override the system 100 that an administrator believes may have been improperly labeled as either an advertisement or non-advertisement.

FIGS. 11C-11D illustrate a segment of the system 100 that may intake data for training and prediction to determine if entered text and/or article is acceptable. As shown, a user may input the data into the large text field and determine whether the data is to be used for either training or prediction. A respective prediction button may be used to manually perform this feature instead of the system 100 performing it autonomously. In some embodiments, unacceptable text may be stored in the system 100 for comparison against potential new articles.

FIG. 11D shows that the system ran the text that was input into the text field and predicted that the article had greater than an 85% chance of being an advertisement. The system 100 may categorize an article as an advertisement, or non-news, if it has a threshold of 50% or greater. However, one skilled in the art will appreciate that the threshold may be greater or smaller depending on need, preference, and circumstance. In this embodiment, the results are shown as predicted and the advertisement possibility is displayed. Whether the article is categorized as excluded is also displayed along with the sanitized text. This article may be stored and used for comparison by the system 100 to determine if other articles should be excluded. As previously stated, potential new articles for posting may be compared against rejected articles to determine their kinship with those rejected articles. Articles that bear a strong kinship with rejected articles may be filtered and archived for later comparison, but not posted. Articles that are dissimilar to the rejected articles may be considered relevant articles and passed on to be posted by the system 100.

Figure 12:
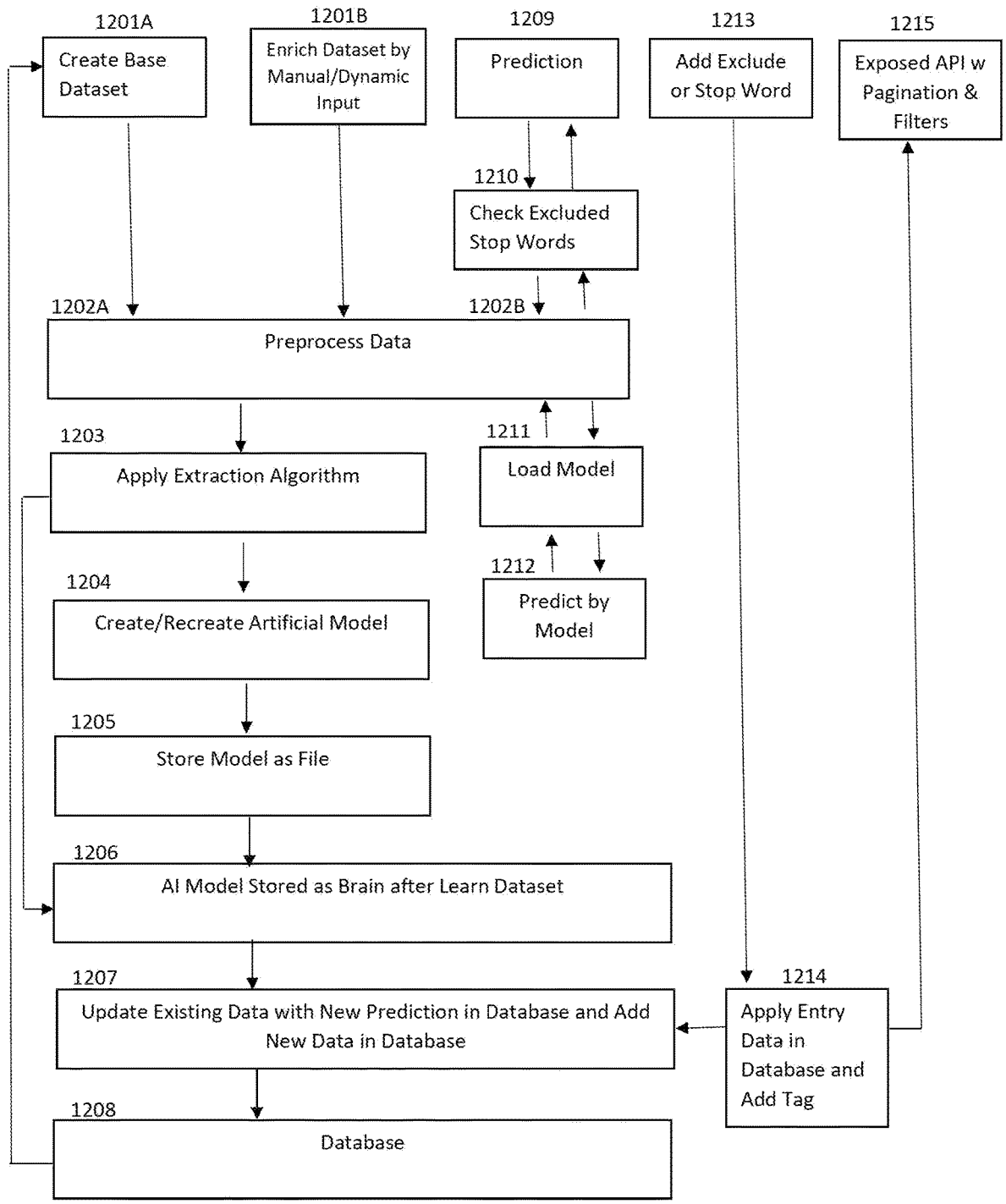
FIG. 12 is a flowchart representation of the dynamic content optimization system backend according to an embodiment of the invention.

FIG. 12 is a flowchart of backend functionality of the system 100. Block 1201A shows the system 100 starting with a dataset that has been autonomously chosen. A dataset may be obtained from the system 100 autonomously pulling an article 1201A or one manually entered by an administrator 1201B. The data may then be preprocessed 1202A as previously described in order to strip the text into a workable medium. Once preprocessed, the extraction algorithm may be applied 1203. The artificial model 1204 may then be created, or recreated 1204 depending on circumstance and the model may be stored as a file 1205. The model may be stored as the brain to assist with making the decision as to whether a chosen article is an advertisement or not, 1206. Then, the existing data may be updated with the new prediction in a system database and new data may be added to the database as well, 1207. The database 1208 may keep this information for storage and reference. As shown, steps 1203 through 1206 may be repeated as necessary.

Further operational features of the system 100 may include the prediction analysis 1209 as previously described that may be checked against and used in conjunction with the list of excluded or stop words 1210. The text may be preprocessed 1202B the model loaded, and prediction made by model 1212. This processes 1209-1212 may be repeated indefinitely to refine the system learning and strengthen future prediction accuracy.

Block 1213 illustrates the ability for the system 100 to provide manual input of words meant for automatic exclusion. These words and data may be applied into the database and tagged appropriately, 1214. Lastly, the system 100 may post approved articles on a client's website 1215.

Figure 13:
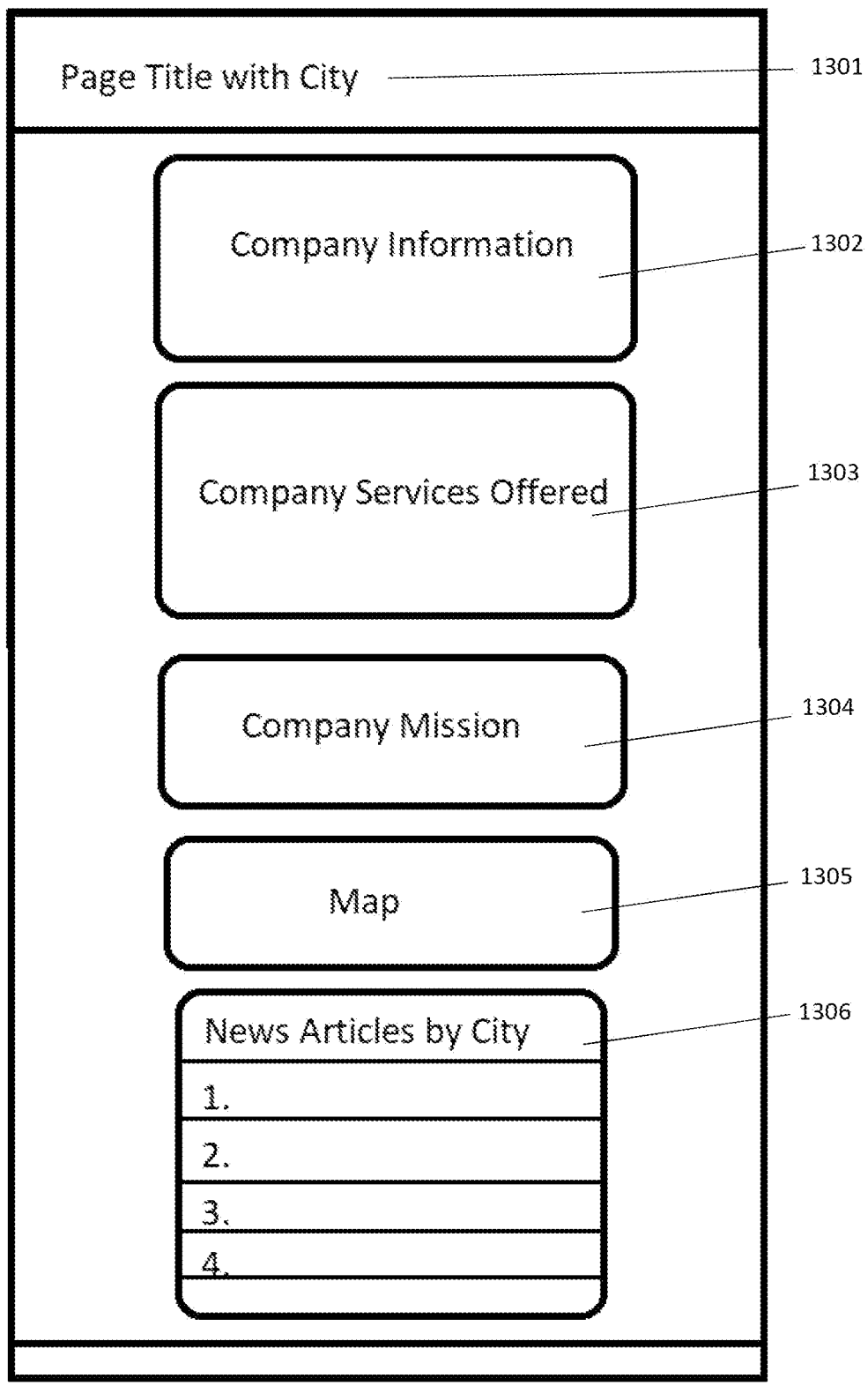
FIG. 13 is a block diagram of a client website generated by the system according to an embodiment of the invention.

FIG. 13 illustrates the architecture of a client website 104, 1300 that may be generated by the system 100. The client website 104, 1300 may include a title section 1301 containing a page title with the specific locale of the client as determined from the client intake and setup engines 101, 102. Further included may be company information including details about the company in the company information section 1302. Other sections generated by the system 100 may include services offered 1303, a mission statement 1304, and a map 1305.

Also shown is the optimized content display module 1306. This section displays the articles that have been retrieved by the optimization engine 106 from the news server 107. These articles have been processed for comparison against previously rejected data in articles and have been found to be dissimilar to those previously rejected articles. As a result, they have been selected as relevant articles to be displayed on the client website 104, 1300. They have been given structured data mark-up with html and displayed within the optimized content display module 1306. Of particular importance to note is that articles may be selected by their comparison and ultimate kinship to the title section. For example, articles with a subject matter that relate to the locale in the title section are given priority for posting. This may occur by the system 100 comparing tagged keyword modifiers or converted input against the locale denoted in the title section. Once they have been on display for a predetermined time period, they may be replaced with new articles that have undergone the same vetting and filtering process.

That which is claimed is:

1. A method for dynamically optimizing content in a dynamic content optimization system, wherein the dynamic content optimization system comprises:
   a collection engine,
   a news server,
   an intake module,
   a client setup engine,
   a client website comprising an optimized content display module,
   an administrative override,
   a learning track,
   an autonomous track, and
   an optimization engine comprising a filter engine and a markup engine,
   wherein the filter engine comprises a testing module, the method comprising:
creating the client website using data gathered from the collection engine;
gathering content for storage within the news server utilizing the collection engine; and
utilizing the optimization engine by:
retrieving the content from the news server;
preprocessing the content for comparison against previously rejected data;
comparing the content for rejection utilizing the testing module, by:
splitting text data of the content into an x-validation variable signifying acceptable content and a y-validation variable signifying unacceptable content,
finding a vector for each text in the x-validation variable,
mapping the vector; and
comparing the vector against a threshold to determine a prediction accuracy, wherein only the x-validation variable text data is transformed into numerical input for testing;
storing x-validation variable data for comparison against potential new articles if the x-validation variable data is considered unacceptable;
posting the potential new articles to the client web site if they do not align with the x-validation variable data to a degree within a predetermined threshold; and
marking non-rejected content and forwarding the marked non-rejected content to the content display module for display on the client website.

2. The method of claim 1 comprising:
receiving user supplied input comprising keyword modifiers and model articles;
scanning user supplied articles for recurring keywords;
comparing user supplied input and article keywords with keyword modifiers to obtain comparison keywords;
scanning and comparing comparison keywords to article text;
obtaining a pre-established threshold number of articles for comparison; and
forwarding articles to the markup engine if the pre-established threshold number of articles has been realized.

3. The method of claim 2 comprising: utilizing the filter engine to autonomously broaden search criteria and rescanning user supplied articles for recurring keywords if the pre-established threshold number of articles has not been realized from a first iteration.

4. The method of claim 1 comprising: utilizing the client setup engine to obtain client identification information, obtaining keyword modifiers for storage, obtaining model articles for storage, and establishing a client dashboard.

5. The method of claim 1 comprising: utilizing the markup engine to receive selected articles, scanning received articles for obtained keywords and applying tag meta data to them, scanning received articles for external links and apply "no follow" tags, placing an article summary on the client dashboard and post a marked-up article on the client website.

6. The method of claim 1 comprising: comparing potential new articles against an archive of rejected articles; and storing rejected articles for comparison against potential new articles.

7. The method of claim 6 comprising: determining, by a pre-established threshold, that potential new articles are dissimilar to rejected articles, accepting and posting the dissimilar new articles on the client website.

8. The method of claim 1, wherein the client website comprises a title section with specific locale of the client as determined from the client intake module and setup engine; and posting new articles to the client website related to the title section.

9. A method for dynamically optimizing content in a dynamic content optimization system, wherein the dynamic content optimization system comprises:
a collection engine,
a news server,
an intake module,
a client setup engine,
a client website comprising an optimized content display module,
an administrative override,
a learning track,
an autonomous track, and
an optimization engine comprising a filter engine and a markup engine,
wherein the filter engine comprises a testing module, a text preprocessor and a transformation engine,
the method comprising:
creating the client website using data gathered from the collection engine;
gathering content for storage within the news server utilizing the collection engine;
removing metadata, removing pre-established valueless words, removing punctuation, removing urls, reducing text to root words, and formatting article text for later processing utilizing the text preprocessor;
transforming text from the text preprocessor into a method recognizable format utilizing the transformation engine; and
utilizing the optimization engine by:
retrieving content from the news server;
preprocessing the content for comparison against previously rejected data;
comparing the content for rejection utilizing the testing module, by:
splitting text data of the content into an x-validation variable signifying acceptable content and a y-validation variable signifying unacceptable content;
finding a vector for each text in the x-validation variable;
mapping the vector; and
comparing the vector against a threshold to determine a prediction accuracy utilizing the testing module, wherein only the x-validation variable text data is transformed into numerical input for testing;
storing x-validation variable data for comparison against potential new articles if the x-validation variable data is considered unacceptable;
marking non-rejected content and forwarding the marked non-rejected content to the content display module for display on the client website; and
posting the potential new articles to the client website if they do not align with the x-validation variable data to a degree within a predetermined threshold.

10. The method of claim 9 further comprising generating a recognizable format by using at least one of one-hot encoding, count vectors, and word embeddings.

11. The method of claim 9, further comprising tokenizing article text that has been preprocessed by way of vocabulary lookup and feature hashing before converting the tokenized text to a method recognizable format utilizing the transformation engine.

12. The method of claim 9, wherein the learning track is comprised of a preprocess segment, a feature extraction segment, a training segment and a testing segment operable to prequalify articles before displaying them on a client website.

13. The method of claim 9, wherein the administrative override comprises a manual entry text field allowing an administrator to enter article text for training; and wherein the administrative override comprises a prediction button manually prompting to predict whether the entered article text is acceptable; and utilizing the manual override by storing unacceptable article text for comparison against potential new articles.

14. A method for dynamically optimizing content in a dynamic content optimization system, wherein the dynamic content optimization system comprises:
   a collection engine,
   a news server,
   an intake module,
   a client setup engine,
   a client website comprising an optimized content display module,
   an administrative override,
   a learning track,
   an autonomous track, and
   an optimization engine comprising a filter engine and a markup engine,
   wherein the filter engine comprises a testing module, a text preprocessor and a transformation engine,
   the method comprising:
   creating the client website using data gathered from the collection engine;
   gathering content for storage within the news server utilizing the collection engine;
   removing metadata, removing pre-established valueless words, removing punctuation, removing urls, reducing text to root words, and formatting article text for later processing utilizing the text preprocessor;
   transforming text from the text preprocessor into a method recognizable format utilizing at least one of word embeddings, count vectors, and one-hot encoding from the transformation engine; and
   utilizing the optimization engine by:
      retrieving content from the news server;
      preprocessing the content for comparison against previously rejected data comparing the content for rejection utilizing the testing module, by:
         splitting text data of the content into an x-validation variable signifying acceptable content and a y-validation variable signifying unacceptable content;
         finding a vector for each text in the x-validation variable;
         mapping the vector, and
         comparing the vector against a threshold to determine a prediction accuracy, wherein only the x-validation variable text data is transformed into numerical input for testing;
      storing x-validation variable data for comparison against potential new articles if the x-validation variable data is considered unacceptable;
      marking non-rejected content and forwarding the marked non-rejected content to the content display module for display on the client website; and
      posting the potential new articles to the client website if they do not align with the x-validation variable data to a degree within a predetermined threshold.

15. The method of claim 14 further comprises tagging unapproved articles based on article content and store them for comparison against potential new articles.

16. The method of claim 14 further using article tags as keyword modifiers for comparison against potential new articles to determine the acceptability of the potential new articles for posting on the client website.

17. The method of claim 14, wherein the client website comprises a title section with a geographic location of the client as determined from the client intake engine and setup engine; and wherein the method further comprises posting articles on the client website related to the geographic location listed in the title section.

* * * * *